US012614869B2

(12) United States Patent
Piromalli

(10) Patent No.: US 12,614,869 B2
(45) Date of Patent: Apr. 28, 2026

(54) INSERT FOR A MULTI-CHANNEL CONNECTOR, MULTI-CHANNEL CONNECTOR AND MULTI-CHANNEL MALE AND FEMALE CONNECTOR KIT

(71) Applicant: LINK S.R.L., Guidonia Montecelio (IT)

(72) Inventor: Marco Piromalli, Guidonia Montecelio (IT)

(73) Assignee: LINK S.R.L., Guidonia Montecelio (IT)

( * ) Notice: Subject to any disclaimer, the term of this patent is extended or adjusted under 35 U.S.C. 154(b) by 947 days.

(21) Appl. No.: 17/776,220

(22) PCT Filed: Nov. 11, 2020

(86) PCT No.: PCT/IT2020/050273

§ 371 (c)(1),
(2) Date: May 11, 2022

(87) PCT Pub. No.: WO2021/095075

PCT Pub. Date: May 20, 2021

(65) Prior Publication Data

US 2022/0393381 A1 Dec. 8, 2022

(30) Foreign Application Priority Data

Nov. 12, 2019 (IT) ........................ 202019000004050

(51) Int. Cl.
*H01R 13/24* (2006.01)
*H01R 24/86* (2011.01)
*H01R 27/00* (2006.01)

(52) U.S. Cl.
CPC ......... *H01R 13/2464* (2013.01); *H01R 24/86* (2013.01); *H01R 27/00* (2013.01)

(58) Field of Classification Search
CPC .... H01R 13/2464; H01R 24/86; H01R 27/00; H01R 13/24
See application file for complete search history.

(56) References Cited

U.S. PATENT DOCUMENTS 3,614,709 A * 10/1971 Schweihs ........... H01R 13/5025 439/246
3,778,747 A * 12/1973 Curcic ................. H01R 13/527 439/157

(Continued)

FOREIGN PATENT DOCUMENTS

JP 2000150088 A 5/2000
WO WO-2024246598 A1 * 12/2024 ............. H01R 13/53

OTHER PUBLICATIONS

Machine-generated English language translation of Description and Claims of JP 2000150088 A (May 30, 2000).

(Continued)

*Primary Examiner* — Travis S Chambers
(74) *Attorney, Agent, or Firm* — Hershkovitz & Associates, PLLC; Abe Hershkovitz

(57) ABSTRACT

An insert for a multi-channel connector comprising a plurality of main contacts for carrying signals, said plurality of main contacts being arranged according to a main arrangement on a first face of said insert. The insert comprises a plurality of secondary contacts for carrying further signals, in particular for carrying data control signals. Said plurality of secondary contacts are arranged according to a secondary arrangement at empty spaces of said first face of said insert. Moreover, said secondary contacts are configured in such a way as to be operational and allow the carrying of said further signals when said insert for said multi-channel connector is coupled to a further reciprocal insert for a reciprocal multi-channel connector at respective first faces, said further reciprocal insert having the same main arrange- (Continued)

ment of a reciprocal plurality of main contacts and the same secondary arrangement of a reciprocal plurality of secondary contacts.

33 Claims, 8 Drawing Sheets

(56) References Cited

U.S. PATENT DOCUMENTS

| | | | | |
|---|---|---|---|---|
| 5,203,723 | A * | 4/1993 | Ritter | H01R 13/521 439/589 |
| 6,099,332 | A * | 8/2000 | Troyan | H01R 27/00 439/176 |
| 9,634,427 | B2 * | 4/2017 | Lerner | H01R 13/5202 |
| 2007/0243762 | A1 * | 10/2007 | Burke | H01R 13/405 439/589 |
| 2015/0364884 | A1 * | 12/2015 | Ledgerwood | H01R 13/53 439/218 |
| 2018/0241163 | A1 * | 8/2018 | Piromalli | H01R 13/10 |

OTHER PUBLICATIONS

International Search Report in International Application No. PCT/IT2020/050273, mailed on Feb. 10, 2021.

Written Opinion of the International Searching Authority in International Application No. PCT/IT2020/050273, mailed on Feb. 10, 2021.

* cited by examiner

INSERT FOR A MULTI-CHANNEL CONNECTOR, MULTI-CHANNEL CONNECTOR AND MULTI-CHANNEL MALE AND FEMALE CONNECTOR KIT

This invention relates to an insert for a multi-channel connector, a multi-channel connector and a multi-channel male and female connector kit.

More specifically, the invention relates to a multi-channel connector capable of carrying a plurality of audio-speaker channels to connect to a respective plurality of loudspeakers.

According to the prior art there are multi-channel connectors, for example of the LKA 32/25 type marketed by the Applicant, comprising 25 size 12 pins and capable of carrying up to 12 audio channels for respective 12 loudspeakers.

However, there is a need for users to be able to use the same connector to carry different types of signals with additional functionalities which can also control data signals.

At the same time, however, whilst developing a new multi-channel connector capable of carrying different types of signals in addition to the 12 audio-speaker channels, compatibility with existing connectors should be maintained.

The aim of the invention is to develop a multi-channel connector capable of carrying both audio-speaker signals and other signals, such as data control signals, whilst maintaining compatibility with existing connectors and therefore already used by users.

The object of the invention is an insert for a multi-channel connector comprising a plurality of main contacts for carrying signals, said plurality of main contacts being arranged according to a main arrangement on a first face of said insert, said insert being characterised in that it comprises a plurality of secondary contacts for carrying further signals, in particular for carrying data control signals, said plurality of secondary contacts being arranged according to a secondary arrangement on at empty spaces of said first face of said insert, said secondary contacts being configured in such a way as to be operational and allow the carrying of said further signals when said insert for a multi-channel connector is coupled to a further reciprocal insert for a reciprocal multi-channel connector at respective first faces, said further reciprocal insert having the same main arrangement of a reciprocal plurality of main contacts and the same secondary arrangement of a reciprocal plurality of secondary contacts, and in such a way as not to be operational and at the same time not to interfere with the coupling between said insert and a reciprocal standard insert for a reciprocal standard multi-channel connector at respective first faces, said reciprocal standard insert having the same main arrangement of a reciprocal plurality of main contacts and lacking a plurality of reciprocal secondary contacts.

Moreover, according to the invention, a part of said main contacts can be arranged on said first face on two concentric circles.

Again according to the invention, a part of said plurality of main contacts may be arranged on said first face on two concentric circles in a symmetrical manner with respect to a first diameter of said first circle and in such a way as to leave empty a space at the same end of said diameter of said first circle.

In particular, according to the invention, the remaining part of said plurality of said main contacts can be arranged on said first face along said diameter of said first circle partially inside also said second inner circle.

Further according to the invention, said insert can comprise twenty-five main contacts.

Preferably according to the invention, fourteen of said main contacts can be arranged on said first outer circle, eight main contacts can be arranged on said second inner circle, and three main contacts can be arranged on said diameter of said first circle.

Further according to the invention, each of the said plurality of main contacts can be designed to carry audio-speaker signals for connection to respective independent acoustic devices.

Again according to the invention, each of said plurality of main contacts can be designed to carry twelve channels.

Again according to the invention, said plurality of secondary contacts can be at least four, in particular four, six or eight.

Preferably according to the invention, said plurality of secondary contacts may be designed to carry further data control signals for the management of further functionalities of the independent acoustic devices.

Further, according to the invention, said plurality of secondary contacts can be at least two pairs of secondary contacts, each pair being reciprocally arranged symmetrically with respect to said diameter of said first circle and with respect to the centre of said first circle.

Again according to the invention, said insert can comprise a further secondary contact arranged along said diameter of said first circle, between four main contacts arranged on the first and on the second circle surrounding it.

In particular, according to the invention, said insert can comprise from one to three further secondary contacts arranged at the first circle, in the area without main contacts.

Alternatively according to the invention, each of said plurality of secondary contacts can be a pin with a retractable tip if compressed and able to return to its original position if not compressed, said plurality of secondary contacts being configured in such a way that they do not retract and are operative and allow the carrying of said further signals when said insert is coupled to a further reciprocal insert at respective first faces, and in such a way that they are not operative, retracting and therefore interfering with the coupling between said insert and a reciprocal standard insert at the respective first faces.

In particular, according to the invention, said plurality of retractable pins can have a fixed base, a retractable and movable tip on one axis with respect to said fixed base, and a spring arranged between said fixed base and said movable tip able to activate the reversible movement of said movable tip when compressed.

More specifically, according to the invention, the diameter of said retractable tip can be about 1 mm.

Again according to the invention, the minimum height of said retractable tip in the non-operating or maximum compression position can be reduced by about half with respect to the maximum height in the operating position.

Always according to the invention, the maximum height of said retractable tip in the operating position can be between 2 mm and 2.5 mm, preferably approximately 2.28 mm, and the minimum height of said retractable tip in the non-operating or maximum compression position can be between 1 mm and 1.2 mm, preferably approximately 1.14 mm.

Further according to the invention, each of said plurality of retractable pins can be designed to connect to a concavity of a reciprocal insert.

Preferably, according to the invention, each of said plurality of main contacts can be a fixed pin protruding from said first face, each pin being designed to connect with a cavity of a reciprocal insert.

Moreover, according to the invention, each of said plurality of secondary contacts may have the end part substantially flush with said first face.

Again, according to the invention, said end part of each of said plurality of secondary contacts can be slightly bevelled, preferably having a concavity.

Again, according to the invention, said end part of each of said plurality of secondary contacts may have a concavity with a radius between 2 mm and 3 mm, preferably about 2.6 mm.

Moreover, according to the invention, the section of each of said plurality of secondary contacts can have a diameter of about 2 mm.

Again, according to the invention, the end part of each of said plurality of secondary contacts can be designed to connect to a pin of a reciprocal insert.

In particular, according to the invention, each of said main contacts can be a cavity designed to connect with a pin of a reciprocal insert.

Moreover, the invention relates to a multi-channel connector comprising an insert as described above.

In particular, according to the invention, said connector can be an LKA 32/25 type connector.

Finally, the object of the invention is a kit comprising a male multi-channel connector comprising a male insert as described above and a reciprocal female multi-channel connector comprising a female insert as described above.

The invention is now described, by way of example and without limiting the scope of the invention, with reference to the accompanying drawings, in which:

FIG. 1*a* shows a front view of the male multi-channel connector according to the invention;

FIG. 1*b* shows a front view of the female multi-channel connector according to the invention to be used with the male multi-channel connector of FIG. 1*a;*

FIG. 2 shows an exploded perspective view of the retractable male pin of the male connector of FIG. 1*a* which can be coupled with the respective additional female pin of the female connector of FIG. 1*b;*

FIG. 3*a* shows a perspective view of the retractable male pin of FIG. 2;

FIG. 3*b* shows a cross-section view of the retractable male pin of FIG. 3*a;*

FIG. 4*a* shows a top view of the additional female pin of FIG. 2;

FIG. 4*b* shows a cross-section view along the plane IVB-IVB' of the additional female pin of FIG. 4*a;*

Figure 7A:
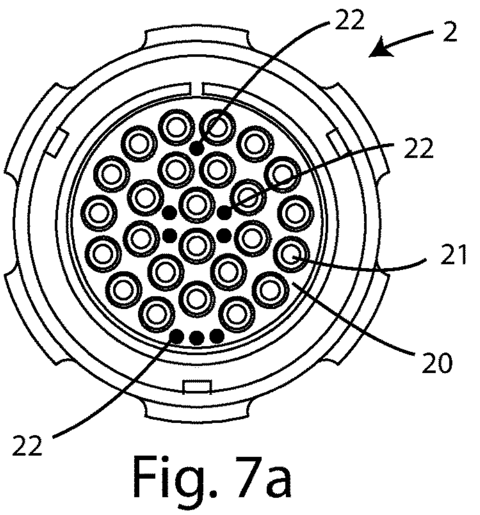
Figure 7B:
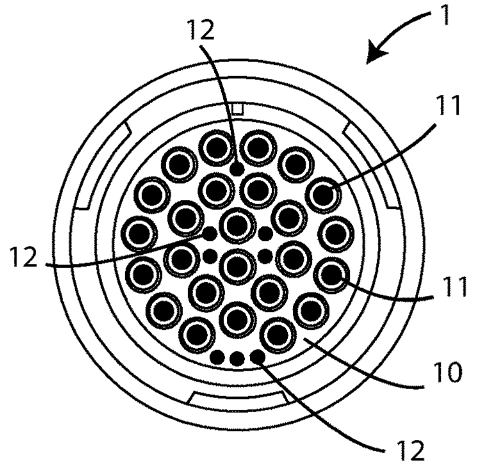
Figure 8A:
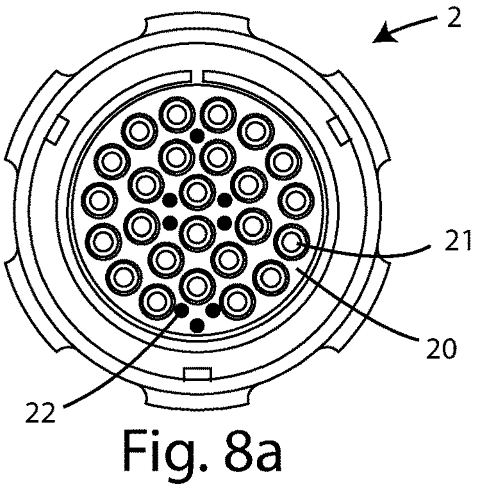
Figure 8B:
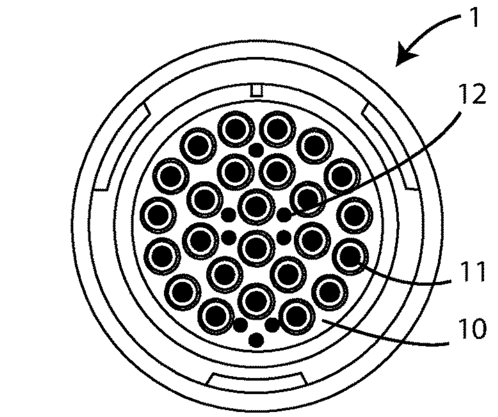
Figure 9A:
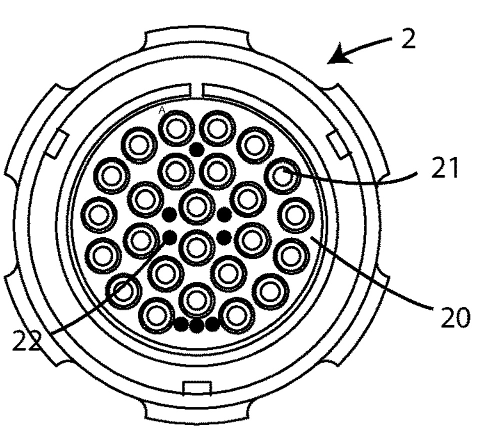
Figure 9B:
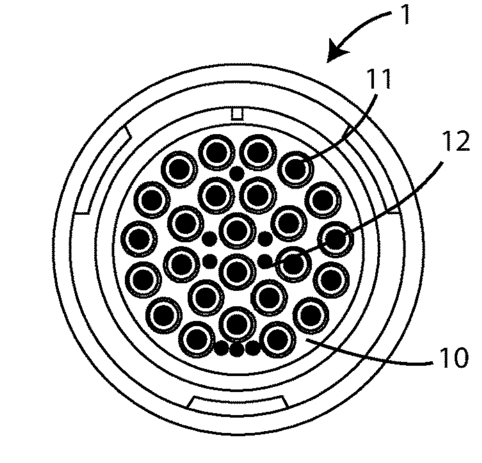
Figure 10A:
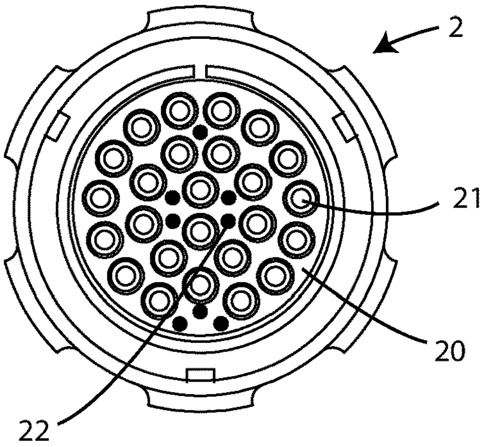
Figure 10B:
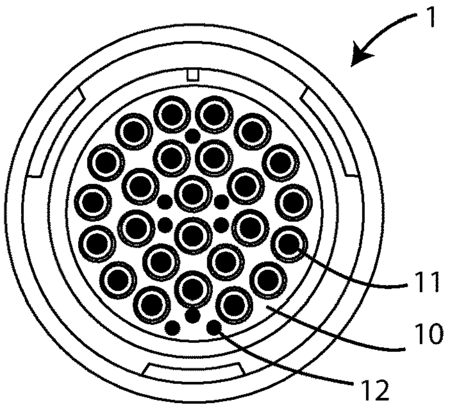
Figure 11A:
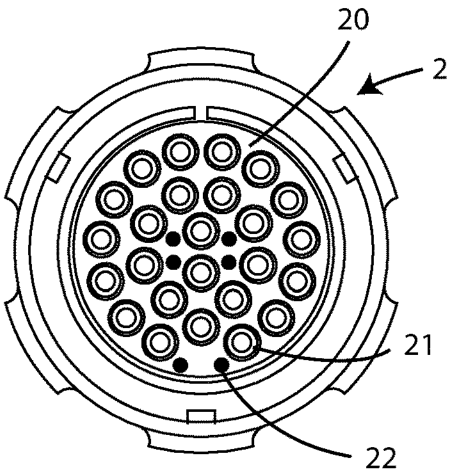
Figure 11B:
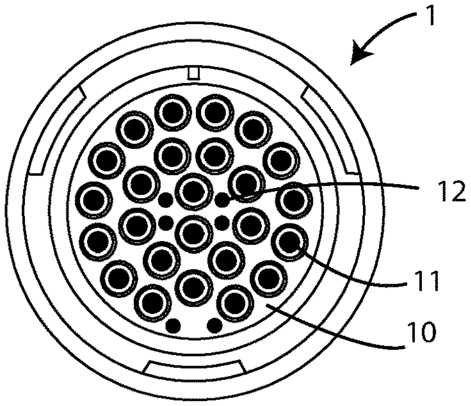
Figure 12A:
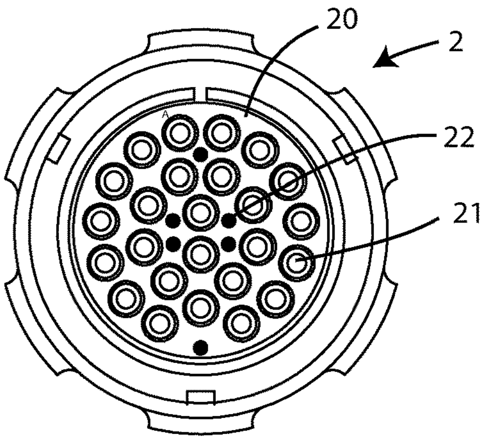
Figure 12B:
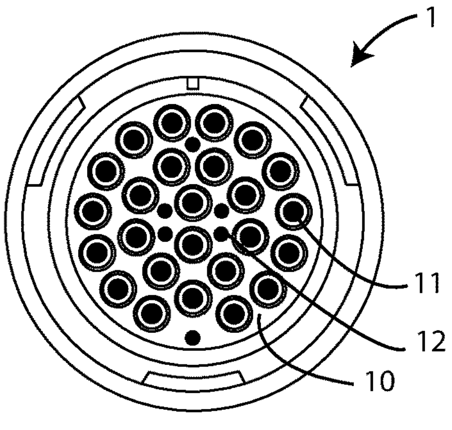
Figure 13A:
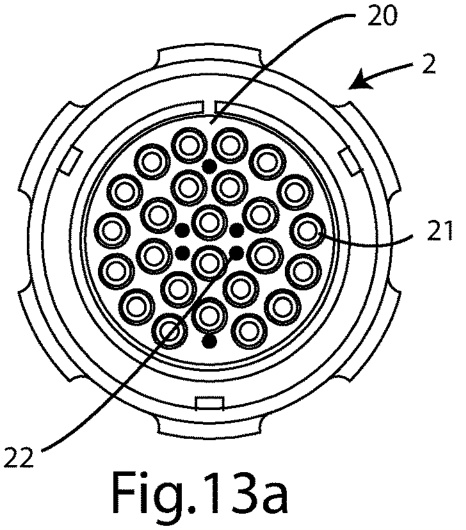
Figure 13B:
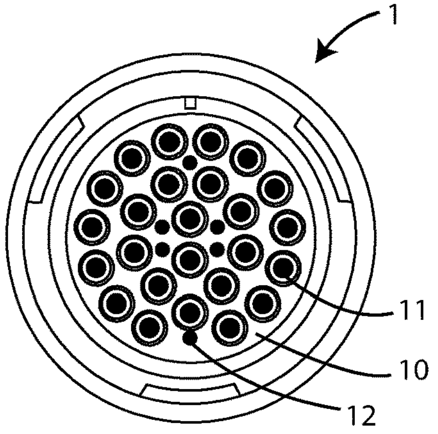
Figure 14A:
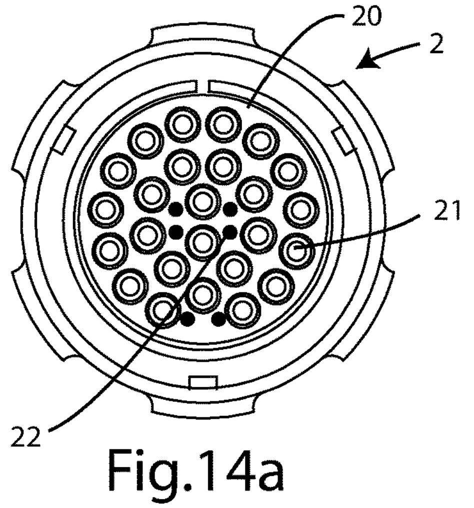
Figure 14B:
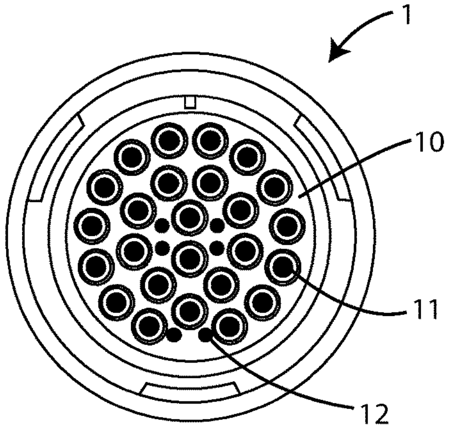
Figure 15A:
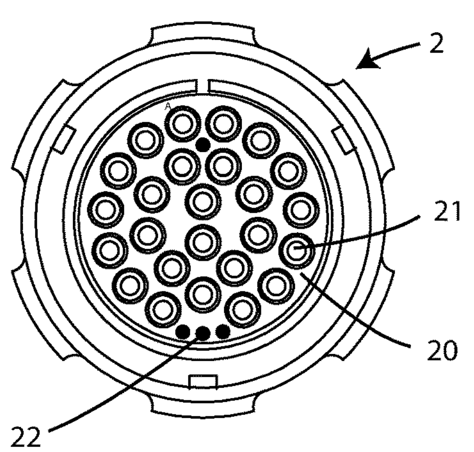
Figure 15B:
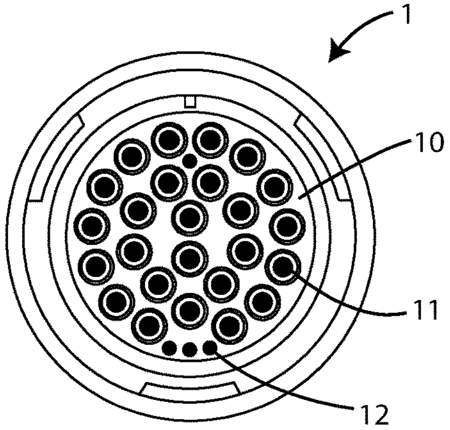
Figure 16A:
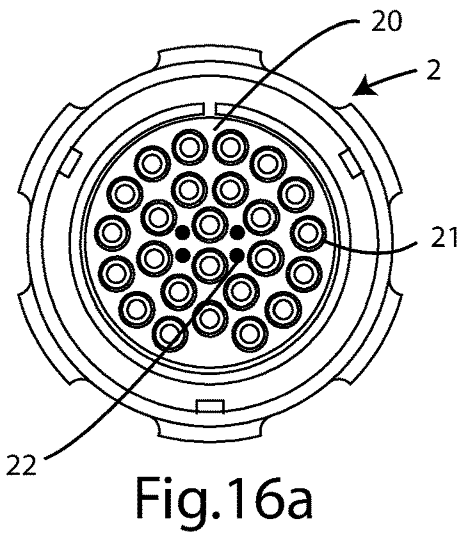
Figure 16B:
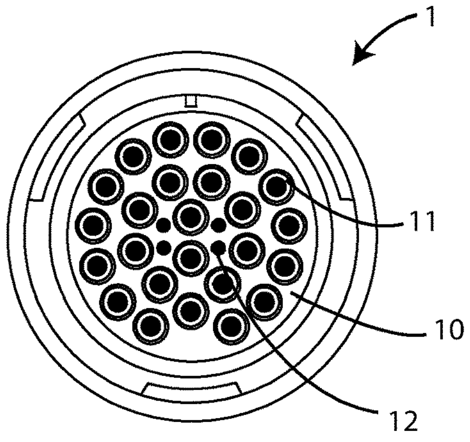
Figure 17A:
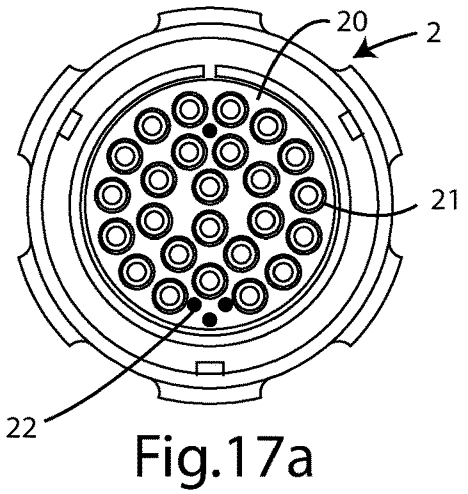
Figure 17B:
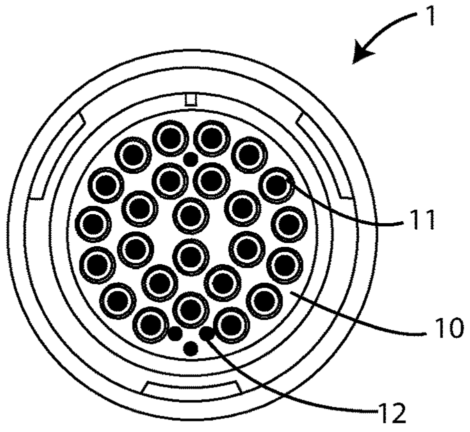
Figure 18A:
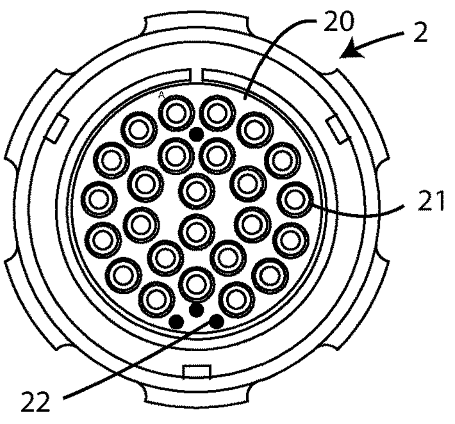
Figure 18B:
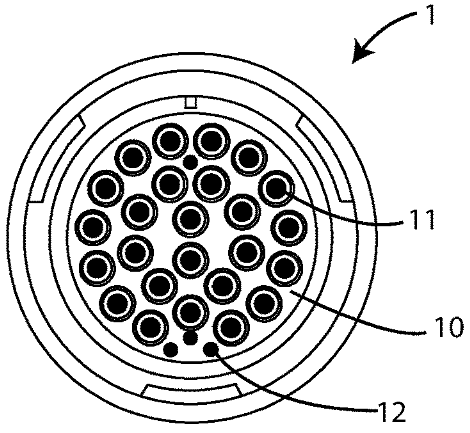
Figure 19A:
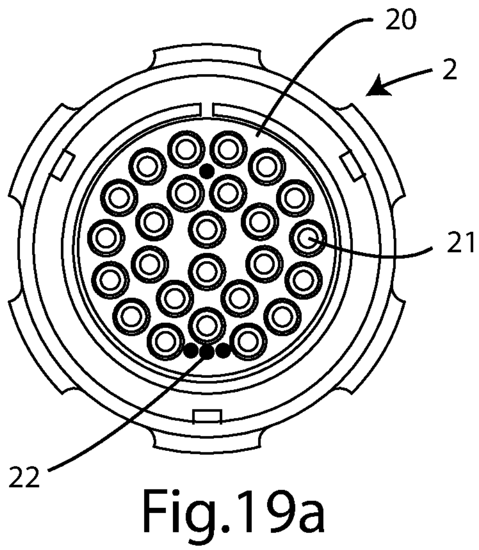
Figure 19B:
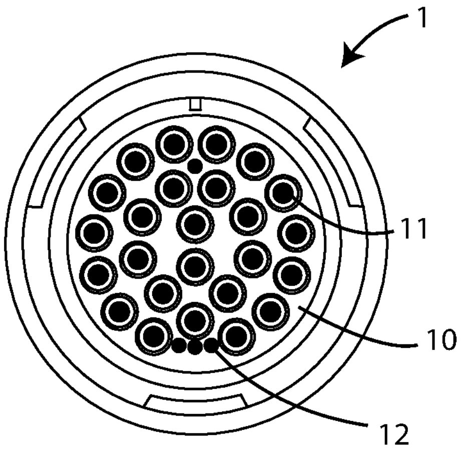

FIGS. 7*a* and 7*b* show front views of an arrangement of the additional pins according to a first embodiment of the invention of both the female multi-channel connector and the male multi-channel connector;

FIGS. 8*a* and 8*b* show front views of an arrangement of the additional pins according to a second embodiment of the invention of both the female multi-channel connector and the male multi-channel connector;

FIGS. 9*a* and 9*b* show front views of an arrangement of the additional pins according to a third embodiment of the invention of both the female multi-channel connector and the male multi-channel connector;

FIGS. 10*a* and 10*b* show front views of an arrangement of the additional pins according to a fourth embodiment of the invention of both the female multi-channel connector and the male multi-channel connector;

FIGS. 11*a* and 11*b* show front views of an arrangement of the additional pins according to a fifth embodiment of the invention of both the female multi-channel connector and the male multi-channel connector;

FIGS. 12*a* and 12*b* show front views of an arrangement of the additional pins according to a sixth embodiment of the invention of both the female multi-channel connector and the male multi-channel connector;

FIGS. 13*a* and 13*b* show front views of an arrangement of the additional pins according to a seventh embodiment of the invention of both the female multi-channel connector and the male multi-channel connector;

FIGS. 14*a* and 14*b* show front views of an arrangement of the additional pins according to an eighth embodiment of the invention of both the female multi-channel connector and the male multi-channel connector;

FIGS. 15*a* and 15*b* show front views of an arrangement of the additional pins according to a ninth embodiment of the invention of both the female multi-channel connector and the male multi-channel connector;

FIGS. 16*a* and 16*b* show front views of an arrangement of the additional pins according to a tenth embodiment of the invention of both the female multi-channel connector and the male multi-channel connector;

FIGS. 17*a* and 17*b* show front views of an arrangement of the additional pins according to an eleventh embodiment of the invention of both the female multi-channel connector and the male multi-channel connector;

FIGS. 18*a* and 18*b* show front views of an arrangement of the additional pins according to a twelfth embodiment of the invention of both the female multi-channel connector and the male multi-channel connector; and FIGS. 19*a* and 19*b* show front views of an arrangement of the additional pins according to a thirteenth embodiment of the invention of both the female multi-channel connector and the male multi-channel connector.

Figure 1A:
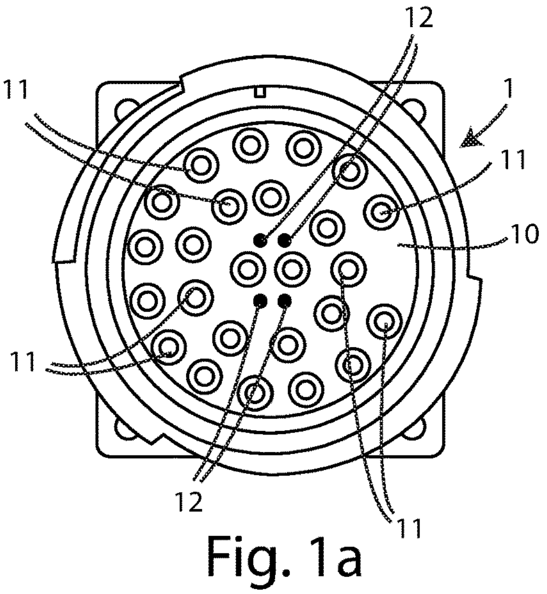
Figure 1B:
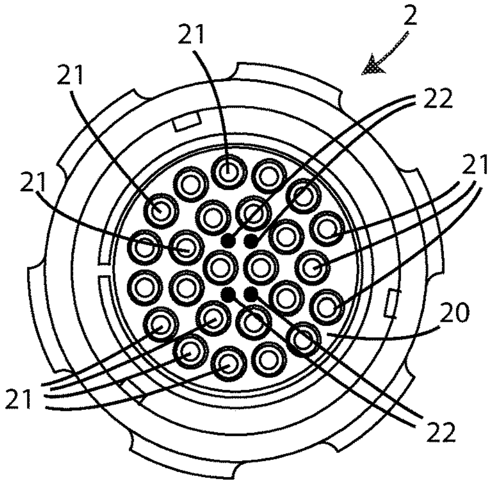

With reference to FIGS. 1*a* and 1 *b*, two reciprocal multi-channel connectors according to the invention are indicated respectively with reference numeral 1, for the male multi-channel connector in FIG. 1*a*, and with reference numeral 2, for the female multi-channel connector in FIG. 1*b*.

Said multi-channel connectors according to the invention have the advantage of being able to be used together in kits or alone in combination with the existing reciprocal standard multi-channel connector, without adversely affecting transmission of the signals.

Each of said male 1 or female 2 multi-channel connectors comprises an insert 10 or 20 comprising a plurality of main contacts 11, 21, in particular, as will be seen below, male main contacts 11 of the male connector 1 and female main contacts 21 of the female connector 2, for carrying signals. More specifically, said plurality of main contacts 11, 21 can be designed to carry audio-speaker signals, in particular audio channels, for connection to respective independent acoustic devices, such as, for example, loudspeakers.

The insert 10 or 20 can be manufactured and sold separately from the components of the connector 1, 2 and assembled after it.

Even more specifically, said plurality of main contacts 11, 21 can be designed for carrying twelve channels, in particular audio-speaker signals.

With regard to the male insert 10 of the male connector 1 (for example, of FIG. 1*a*), each of said plurality of main contacts is a fixed pin 11 protruding from a first face of the connector 1, each pin 11 being designed to connect with a cavity of a reciprocal female multi-channel connector 2.

In fact, as can be seen in FIG. 1*b*, each of said main contacts 21 of the female insert 20 of the female connector 2 is a cavity designed to connect with a pin of a reciprocal male multi-channel connector 1.

Said plurality of main contacts 11, 21 is arranged according to a main arrangement on the first face of said connector 1, 2.

In particular, as can be seen from the embodiments of the multi-channel connectors 1, 2 according to the invention shown in FIGS. 1*a*, 1 *b*, and from 8*a* to 19*b* a part of said main contacts 11, 21 can be arranged on said first face on two concentric circles.

In particular, a part of said plurality of main contacts 11, 21 may be arranged on said first face on two concentric circles in a symmetrical manner with respect to a first diameter of said first circle and in such a way as to leave empty a space at the same end of said diameter of said first circle.

Again according to the invention, the remaining part of said plurality of said main contacts 11, 21 can be arranged on said first face along said diameter of said first circle partially inside also said second inner circle.

According to the embodiments shown, the multi-channel connector 1, 2 has twenty-five main contacts 11, 21.

More specifically, these twenty-five main contacts are arranged as follows: fourteen of said main contacts 11, 21 are arranged on said first outer circle, eight main contacts 11, 21 are arranged on said second inner circle, and three main contacts 11, 21 are arranged on said diameter of said first circle.

Preferably, the male 1 and female 2 connectors according to the invention have the main contacts 11, 21 arranged as in the existing LKA 32/25 type connector.

The insert 10, 20 according to the invention further comprises a plurality of secondary contacts 12, 22 for carrying further signals. In particular, said plurality of secondary contacts 12, 22 may be designed to carry further data control signals to manage other functions of the respective independent acoustic devices (for example, inclination, lights, etc.).

Each one of said plurality of secondary contacts 12, 22 of an insert 10, 20 for a first connector 1, 2 is designed to connect with a respective secondary contact 22, 12 of a reciprocal insert 20, 10 for a reciprocal multi-channel connector 2, 1.

In the insert 10, 20 according to the invention, said plurality of secondary contacts 12, 22 is arranged according to a secondary arrangement at empty spaces of said first face of said connector 1, 2.

Said secondary contacts 12, 22 of the insert 10, 20 according to the invention are configured in such a way as to be operational and allow the carrying of said further signals when said multi-channel connector 1, 2 is coupled to a further reciprocal multi-channel connector 2; 1 at respective first faces, said further reciprocal multi-channel connector 2, 1 having the same main arrangement of a reciprocal plurality of main contacts 21, 11 and the same secondary arrangement of a reciprocal plurality of secondary contacts 22, 12, and in such a way as not to be operational and at the same time not to interfere with the coupling between said insert 10, 20 of a multi-channel connector 1, 2 and a reciprocal insert 20, 10 of a reciprocal standard multi-channel connector at the respective first faces, said reciprocal standard multi-channel connector having the same main arrangement of a reciprocal plurality of principal contacts and lacking a plurality of reciprocal secondary contacts.

In particular, said plurality of secondary contacts 12, 22 may be at least four, in particular four, six or eight.

In particular, as can be seen from the embodiments of the multi-channel connectors 1, 2 according to the invention shown in FIGS. 1*a*, 1 *b*, and from 8*a* to 20*b*, said plurality of secondary contacts 12, 22 can be at least two pairs of secondary contacts 12, 22 each pair being reciprocally arranged symmetrically with respect to said diameter of said first circle and with respect to the centre of said first circle.

Moreover, said multi-channel connector can comprise a further secondary contact 12, 22 arranged along said diameter of said first circle, between four main contacts 11, 21 arranged on the first and on the second circle surrounding it.

Furthermore, one to three further secondary contacts 12, 22 can be arranged at the first circle, in the area without main contacts.

Figure 2:
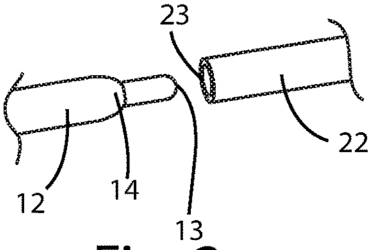
Figure 3A:
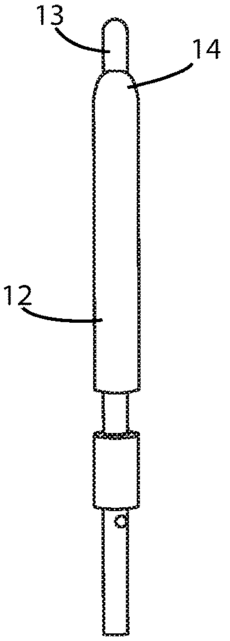
Figure 3B:
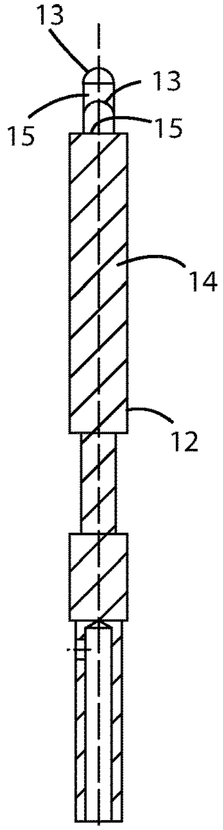

With particular reference to FIGS. 2 and 3*a* and 3*b*, the secondary contact 12 of the male multi-channel connector 1 according to the invention can be observed.

Each of said multiple secondary contacts 12 of the male multi-channel connector 1 can be a retractable pin with the tip 13 retractable if compressed and able to return to its original position if not compressed. Said plurality of retractable pins 12 being configured in such a way that they do not retract and are operative and allow the carrying of said further signals when said male multi-channel connector 1 is coupled to a further reciprocal female multi-channel connector 2 according to the invention at respective first faces, and in such a way that they are not operative, retracting and therefore not interfering with the coupling between said male multi-channel connector 1 according to the invention and a reciprocal standard female multi-channel connector at respective first faces.

In particular, each of said plurality of retractable pins 12 of the male multi-channel connector 1 is designed to connect to a concavity of respective secondary contacts 22 of a reciprocal multi-channel connector 2 according to the invention.

As can be seen in particular in FIGS. 3*a* and 3*b*, each of said plurality of retractable pins 12 has a fixed base 14, a retractable and movable tip 13 on one axis with respect to said fixed base 14, and means 15 of retraction, in particular a spring 15, arranged between said fixed base 14 and said movable tip 13 capable of activating the reversible movement of said movable tip 13 when compressed.

In particular, the diameter of said retractable tip 13 can be about 1 mm.

Moreover, the minimum height of said retractable tip 13 in the non-operating or maximum compression position can be configured in such a way as to be reduced by about half with respect to the maximum height in the operating position.

Further, the maximum height of said retractable tip 13 in the operating position can be between 2 mm and 2.5 mm, preferably approximately 2.28 mm, and the minimum height of said retractable tip 13 in the non-operating or maximum compression position can be between 1 mm and 1.2 mm, preferably approximately 1.14 mm.

Figure 4A:
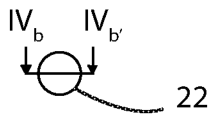
Figure 4B:
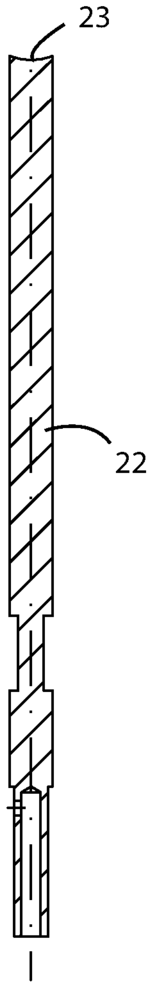
Figure 5:
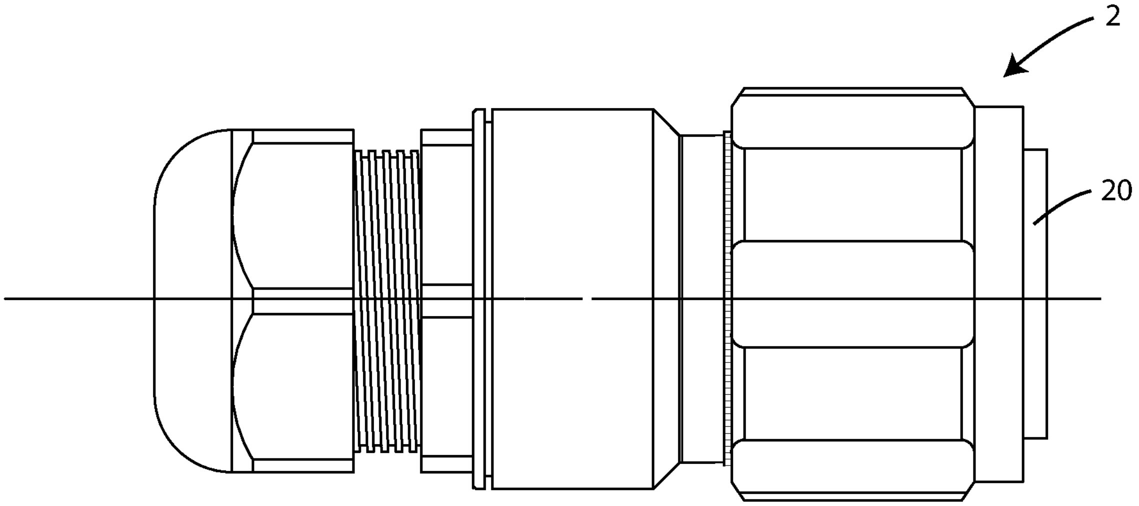
FIG. 5 shows a side view of the female multi-channel connector according to the invention.
Figure 6:
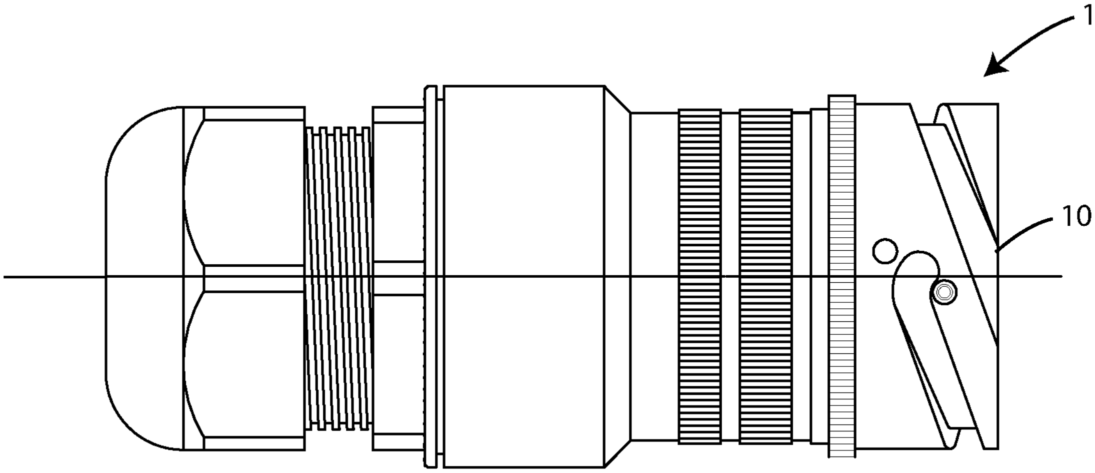
FIG. 6 shows a side view of the male multi-channel connector according to the invention.

With reference to FIGS. 4*a* and 4*b*, a secondary contact 22 of a female multi-channel connector 2 according to the invention can be seen. Each of said plurality of secondary contacts 22 can have the end part 23 substantially flush with said first face of connector 2.

Moreover, said end part 23 of each of said plurality of secondary contacts 22 may have a concavity with a radius of between 2 mm and 3 mm, preferably about 2.6 mm.

In particular, said end part 23 of each of said plurality of secondary contacts 22 can be slightly bevelled at the edges of contact.

In addition, the section of each of said plurality of secondary contacts 22 can have a diameter of about 2 mm.

Finally, the end part 23 of each of said plurality of secondary contacts 22 can be designed to connect to a retractable pin 12 of a reciprocal male multi-channel connector 1 according to the invention.

Advantageously, the multi-channel connector according to the invention is therefore able to support a greater number of signals with different functionalities which together allow a more complete management of independent acoustic devices.

Moreover, it is robust and reliable since it has been designed according to the specifications for connectors designed for the military sector.

Furthermore, it allows further signals of different types to be supported, compared to standard connectors of the same type, but is at the same time fully compatible with them.

With regard to the male connector according to the invention, it may have a spring configuration which allows the contact to retract beneath the surface of the insert, once the male connector is connected to the reciprocal female connector.

In fact, since the end part is retractable, if the additional pin is present on the female connector, the connection for the additional signal is made; if the additional pin is not present, it allows the female connector to make contact with the male connector without interfering with the connection, making the male connector compatible with the traditional female connector without additional pins.

The secondary contact of the female connector is also advantageously arranged inside the insert of the connector with the end part flush with the insert itself. In the case of connection with a traditional male connector without additional pins, the connection is made as if there were no additional pins, making it also compatible with a traditional male connector.

Moreover, a further advantage of the presence of the spring in the retractable pin of the male connector is that it ensures a stable contact between the additional contacts of the reciprocal male and female connectors, thanks to the spring of the retractable pin and its configuration in such a way that it is not necessary for the respective secondary contact of the female connector to be hollow inside.

One aspect of the present invention consists in the insertion of further contacts in addition to an existing connector for the connection of audio-speaker signals, in particular 25 main contacts. The further contacts, so-called secondary contacts, allow the connection of signals for data control management in such a way as to achieve a more complete management of independent acoustic devices. Furthermore, since these secondary contacts are made using special retractable contacts, the connector becomes fully compatible with "traditional" connectors which do not have these further contacts. The different configurations can have 4, 6 or 8 additional contacts.

The preferred embodiments have been described above, but it shall be understood that the invention may be modified and/or adapted by experts in the field without thereby departing from the scope of the inventive concept, as defined in the claims herein.

The invention claimed is:

1. An insert for a multi-channel connector comprising a plurality of main contacts for carrying signals, said plurality of main contacts being arranged according to a main arrangement on a first face of said insert, said insert comprising a plurality of secondary contacts for carrying further signals, said plurality of secondary contacts being arranged according to a secondary arrangement at empty spaces of said first face of said insert, said secondary contacts being configured in such a way as to be operational and allow the carrying of said further signals when said insert for a multi-channel connector coupled to a further reciprocal insert for a reciprocal multi-channel connector at respective first faces, said further reciprocal insert having the same main arrangement of a reciprocal plurality of main contacts and the same secondary arrangement of a reciprocal plurality of secondary contacts, and in such a way as not to be operational and at the same time not to interfere with the coupling between said insert and a reciprocal standard insert for a standard multi-channel connector at respective first faces, said reciprocal standard insert having the same main arrangement of a reciprocal plurality of main contacts and lacking a plurality of reciprocal secondary contacts;

wherein a part of said main contacts is arranged on said first face on two concentric circles.

2. The insert according to claim 1, wherein said insert provides for twenty-five main contacts.

3. The insert according to claim 1, wherein each of said plurality of main contacts is designed to carry one of, signals or audio-speaker channels for connection to respective independent acoustic devices.

4. The insert according to claim 1, wherein each of said plurality of main contacts is designed for carrying twelve signals.

5. The insert according to claim 1, wherein said plurality of secondary contacts are designed to carry further data control signals for the management of further functionalities of independent acoustic devices.

6. The insert according to claim 1, wherein each of said plurality of main contacts is a fixed pin protruding from said first face, each pin being configured to connect with a cavity of a reciprocal insert.

7. The insert according to claim 1, wherein each of said main contacts is a cavity configured to connect with a pin of a reciprocal insert.

8. The insert according to claim 1, wherein said signals comprise data control signals.

9. The insert according to claim 1, wherein a part of said plurality of main contacts is arranged on said first face on two concentric circles in a symmetrical way with respect to a first diameter of a first circle and in such a way as to leave empty a space at the same end of said diameter of said first circle.

10. The insert according to claim 9, wherein a remaining part of said plurality of said main contacts is arranged on said first face along said diameter of said first circle partially inside said second inner circle.

11. The insert according to claim 1, wherein fourteen of said main contacts are arranged on a first outer circle, eight main contacts are arranged on a second inner circle, and in that three main contacts are arranged on said diameter of said first circle.

12. The insert-according to claim 11, wherein said plurality of secondary contacts are at least two pairs of secondary contacts each pair being reciprocally arranged symmetrically with respect to a diameter of a first circle and with respect to the centre of said first circle.

13. The insert according to claim 1, wherein each of said plurality of secondary contacts is a pin with a retractable tip if compressed and able to return to its original position if not compressed, said plurality of secondary contacts being configured in such a way that they establish an operative connection for carrying said further signals when said insert is coupled to a further reciprocal insert at respective first faces, and in such a way that they do not establish an operative connection, retracting and therefore without interfering with the coupling between said insert and a reciprocal standard insert at the respective first faces.

14. The insert according to claim 13, wherein said plurality of secondary contacts have a fixed base, a retractable and movable tip on one axis with respect to said fixed base, and a spring arranged between said fixed base and said movable tip configured to activate a reversible movement of said movable tip when compressed.

15. The insert according to claim 13, wherein a diameter of said retractable tip is about 1 mm.

16. The insert according to claim 13, wherein the minimum height of said retractable tip in the non-operating or maximum compression position is reduced by about half compared to the maximum height in the operating position.

17. The insert according to claim 1, wherein each of said plurality of secondary contacts has an end part substantially flush with said first face.

18. The insert according to claim 17, wherein the end part of each of said plurality of secondary contacts is configured to connect to a pin of a reciprocal insert.

19. The insert according to claim 17, wherein the end part of each of said plurality of secondary contacts is slightly bevelled.

20. The insert according to claim 19, wherein said end part of each of said plurality of secondary contacts has a concavity with a radius between 2 mm and 3 mm.

21. The insert according to claim 20, wherein the section of each one of said plurality of secondary contacts has a diameter of about 2 mm.

22. A multi-channel connector comprising the insert according to claim 1.

23. The multi-channel connector according to claim 22, wherein said multi-channel connector is an LKA 32/25 type connector.

24. The insert according to claim 1, wherein there are at least four of said plurality of secondary contacts.

25. The insert according to claim 24, wherein there are at least six of said plurality of secondary contacts.

26. The insert according to claim 24, wherein there are at least eight of said plurality of secondary contacts.

27. The insert according to claim 13, wherein the maximum height of said retractable tip in the operating position is between 2 mm and 2.5 mm, and in that the minimum height of said retractable tip in the non-operating or maximum compression position is between 1 mm and 1.2 mm.

28. The insert according to claim 27, wherein the maximum height of said retractable tip in the operating position is about 2.28 mm.

29. The insert according to claim 27, wherein the minimum height of said retractable tip in the non-operating or maximum compression position is about 1.14 mm.

30. An insert for a multi-channel connector comprising a plurality of main contacts for carrying signals, said plurality of main contacts being arranged according to a main arrangement on a first face of said insert, said insert comprising a plurality of secondary contacts for carrying further signals, said plurality of secondary contacts being arranged according to a secondary arrangement at empty spaces of said first face of said insert, said secondary contacts being configured in such a way as to be operational and allow the carrying of said further signals when said insert for a multi-channel connector is coupled to a further reciprocal insert for a reciprocal multi-channel connector at respective first faces, said further reciprocal insert having the same main arrangement of a reciprocal plurality of main contacts and the same secondary arrangement of a reciprocal plurality of secondary contacts, and in such a way as not to be operational and at the same time not to interfere with the coupling between said insert and a reciprocal standard insert for a standard multi-channel connector at respective first faces, said reciprocal standard insert having the same main arrangement of a reciprocal plurality of main contacts and lacking a plurality of reciprocal secondary contacts, wherein a part of said main contacts is arranged on said first face on two concentric circles, wherein fourteen of said main contacts are arranged on a first outer circle, eight main contacts are arranged on a second inner circle, and in that three main contacts are arranged on a diameter of said first circle, and wherein said insert comprises a further secondary contact arranged along said diameter of said first circle, between four main contacts-arranged on the first and on the second circle surrounding it.

31. The insert according to claim 30, wherein said insert comprises from one to three further secondary contacts arranged at the first circle, in the area without main contacts.

32. An insert for a multi-channel connector comprising a plurality of main contacts for carrying signals, said plurality of main contacts being arranged according to a main arrangement on a first face of said insert, said insert comprising a plurality of secondary contacts for carrying further signals, said plurality of secondary contacts being arranged according to a secondary arrangement at empty spaces of said first face of said insert, said secondary contacts-being configured in such a way as to be operational and allow the carrying of said further signals when said insert for a multi-channel connector is coupled to a further reciprocal insert for a reciprocal multi-channel connector at respective first faces, said further reciprocal insert having the same main arrangement of a reciprocal plurality of main contacts and the same secondary arrangement of a reciprocal plurality of secondary contacts, and in such a way as not to be operational and at the same time not to interfere with the coupling between said insert and a reciprocal standard insert for a standard multi-channel connector at respective first faces, said reciprocal standard insert having the same main arrangement of a reciprocal plurality of main contacts and lacking a plurality of reciprocal secondary contacts, wherein each of said plurality of secondary contacts is a pin with a retractable tip if compressed and able to return to its original position if not compressed, said plurality of secondary contacts being configured in such a way that they establish an operative connection for carrying said further signals when said insert is coupled to a further reciprocal insert at respective first faces, and in such a way that they do not establish an operative connection, retracting and therefore without interfering with the coupling between said insert and a reciprocal standard insert at the respective first faces, and wherein each of said plurality of retractable pins is configured to connect to a concavity of a reciprocal insert.

33. The insert according to claim 32, wherein said signals comprise data control signals.

* * * * *